United States Patent [19]
Woodard et al.

[11] 3,868,692
[45] Feb. 25, 1975

[54] GOLF YARDAGE FINDER
[76] Inventors: Roland L. Woodard, 1308 National Ave., New Bern, N.C. 28560; Patrick L. Hughes, 4338 W. Rose Lane, Glendale, Ariz. 85301
[22] Filed: Sept. 13, 1973
[21] Appl. No.: 396,731

[52] U.S. Cl............. 343/112 D, 325/67, 273/32 B
[51] Int. Cl............................................. G01s 3/02
[58] Field of Search................... 343/112 D; 325/67; 273/213

[56] References Cited
UNITED STATES PATENTS
2,955,778  10/1960  Beveridge ....................... 343/112 D
3,063,010  11/1962  Richardson ........................... 325/67
3,121,228  2/1964   Kalmus ............................ 343/112 D
3,782,730  1/1974   Horchler............................ 273/213

OTHER PUBLICATIONS
The Radio Amateur's Handbook, 31st edition, West Hartford, Conn., ARRL, 1954, p. 119–120 Tk 6550 R162.

Primary Examiner—Richard A. Farley
Assistant Examiner—T. M. Blum

[57] ABSTRACT

The embodiment of the invention disclosed herein is directed to a golf yardage measuring device and system to provide a visual read-out of the distance between a golfer and a particular green on a golf course. A plurality of transmitter units are located throughout the golf course, one transmitter unit at each green, and each transmitter unit preferably being arranged to generate an RF signal of a different frequency. Each transmitter is adapted to radiate the RF frequency outwardly of the green over the approach fairway leading up to the green. Each golfer is equipped with a receiver unit to be carried while playing on the particular golf course. Each receiver unit is provided with means for selecting reception of any one of the plurality of transmitter units, preferably the selection corresponding to that transmitter unit upon which the golfer is approaching the green. When the receiver unit is tuned to the proper frequency to receive its appropriate transmitter signal the receiver will be activated to provide a direct indication on a read-out meter of the distance between the golfer and the green then and there being approached. This then allows the golfer to select the desired club for the approach shot.

3 Claims, 5 Drawing Figures

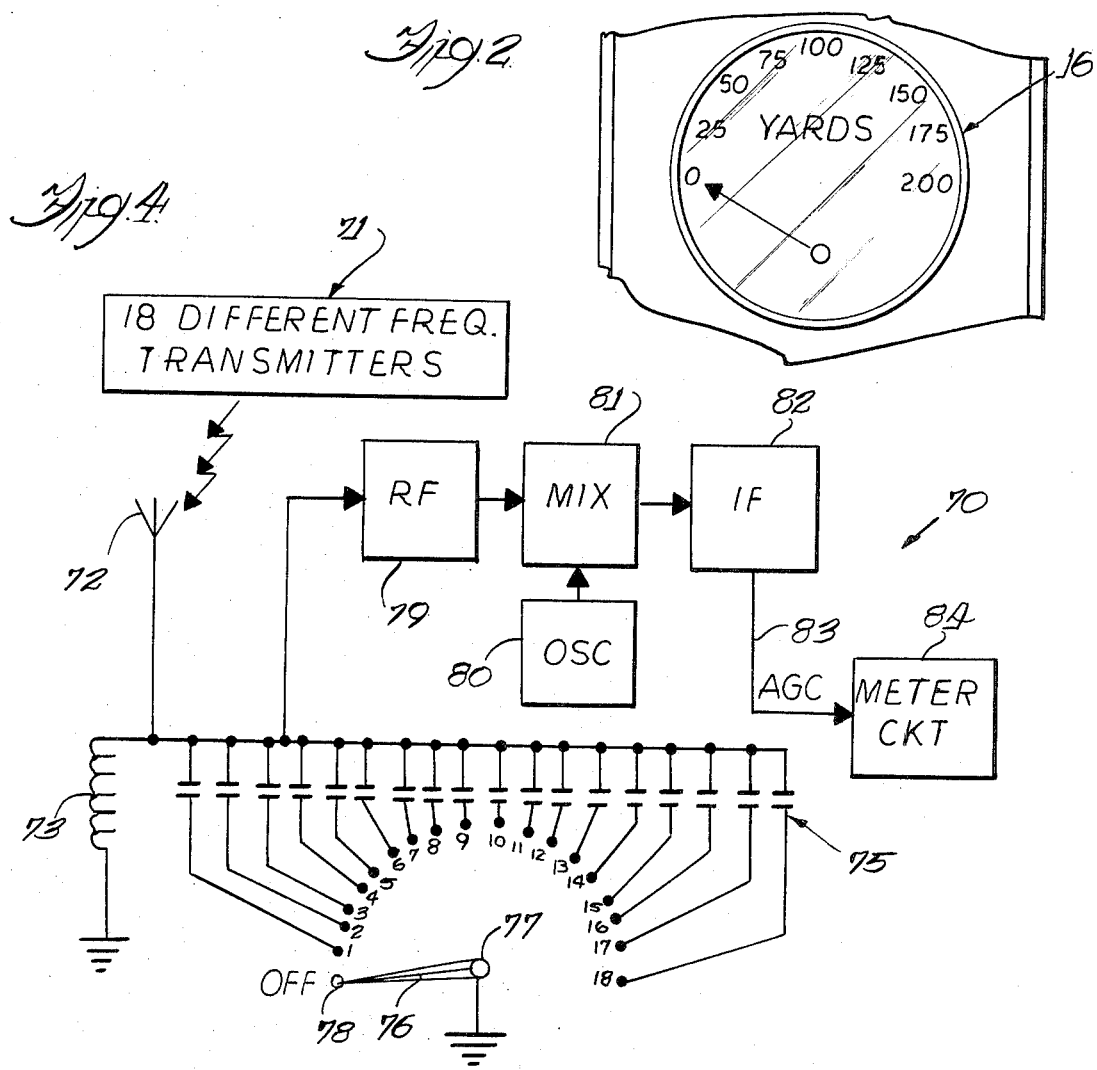
Fig. 2
Fig. 4
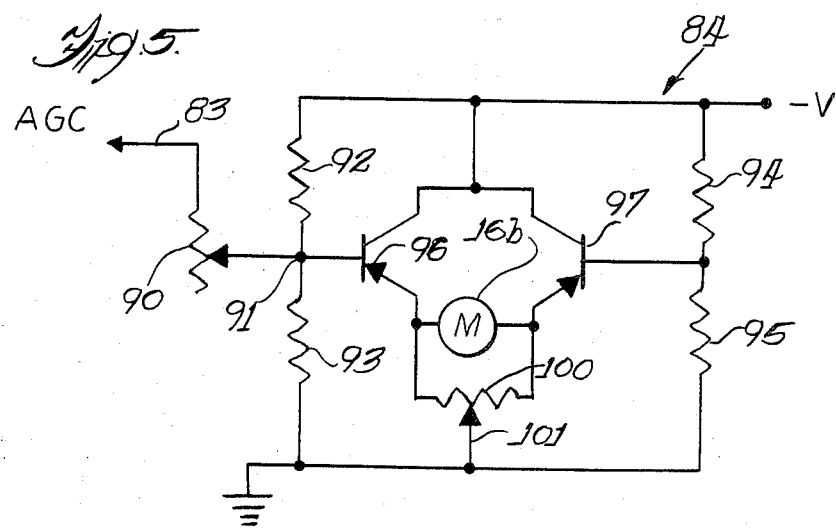
Fig. 5

GOLF YARDAGE FINDER

BACKGROUND OF THE INVENTION

1. Field of the Invention

This invention relates generally to improvements in structures and apparatus used primarily in the field of golf, and more particularly to a distance measuring device and its combination in a system which allows golfers to readily determine the distance of their next shot while approaching a green. However, it will be understood that while this invention is directed particularly to a device used in the field of golf, the specific device disclosed herein can be used in other allied fields such as range finding and the like.

2. Description of the Prior Art

Heretofore, distance measuring on a golf course has been a rather complicated, if not impossible ordeal for the average golfer. Some pocket carrying devices have been developed for the golfer to utilize while playing golf on a golf course. For example, one particular type of range finder is a slide viewing window having a vertical extent calibrated in yards while the space between upper and lower viewing lines is adjusted. The user merely sights through an opening in the range finder and adjusts the upper and lower viewing lines until they correspond substantially to the upper and lower extent of the pin located on the green. Once this is done the viewer looks to the side of the indicator to read the range, in yards, thereby allowing him to select the appropriate club for his next shot.

While this is a relatively straight forward approach, it still requires a relatively steady hand of the user to hold the sight window in place while aligning the upper and lower movable lines. Another approach to determining the yardage between the green and a golfer's next shot is for the golfer to pace off the distance one step at a time, and estimate that each step is a yard.

SUMMARY OF THE INVENTION

Accordingly, it is an object of this invention to provide a golf distance measuring device to be used by golfers which overcomes the above limitations without adversely increasing the cost or complexity of such device or system. A feature of the present invention is the utilization of a receiver unit to be carried by the golfer and to be activated by the golfer when a distance measurement is desired. The receiver unit may include an on-off switch, and a frequency selector switch, preferably calibrated in numbers from 1 to 18, thereby corresponding to the number of holes on a golf course. When the receiver unit is turned on, and directed generally in the direction of the green then and there being approached, the meter will give an indication of the signal field strength of the transmitter located at the green, this transmitter preferably being secured to the flag pin. This signal field strength is calibrated in yards and thereby gives an indication of the relative distance of the transmitter from the golfer. This then is translated by the golfer to enable him to select the desired club for his next approach shot.

Another feature of this invention is to provide a new and improved golf yardage distance measuring system which allows a golfer to determine the distance between the golf green and his next shot which includes a meter read-out device located on the receiver, which meter read-out device is calibrated in the usual measurement increments associated with the golf course being played.

Another feature of this invention is to provide a new and improved golf yardage distance measuring system which allows a golfer to determine the distance from where he or she stands to the green, which includes a meter read-out device calibrated in yards, preferably from between 0 and 200 yards.

Another feature of this invention is to provide a new and improved golf yardage distance measuring system which allows a golfer to determine the distance from where he or she stands to the green, which includes a tunable RF receiver adopted selectively to receive RF signals from a selected one of a plurality of transmitters associated with the plurality of holes of a golf course, said tunable receiver being calibrated in increments of 1 to 18 to indicate the hole then and there being played.

Another feature of this invention is to provide a new and improved golf yardage distance measurement system which allows a golfer to determine the distance from where he or she stands to the green, which includes a tunable RF radio receiver section having a plurality a fixed tuned elements and a rotary switching device selectively to engage a specific one of said fixed tuned elements, thereby precisely tuning the radio receiver to receive a desired one of said plurality of transmitter units associated with the golf course, said switching device being calibrated between 1 and 18 to correspond to the number of holes associated with the golf course.

Another feature of this invention is to provide a new and novel golf yardage distance measurement system which allows a golfer to determine the distance from where he or she stands to a green, which includes an automatic gain control circuit providing a voltage output signal the amplitude of which is indicative inversely to the distance being measured, thereby providing means for direct read-out of the distance.

Briefly, one of the problems most frequently encountered by a golfer is that of ascertaining the distance between his or her ball from the green so that he or she can determine which club is to be used for the next approach shot. The golf yardage finder of this invention is an inovation utilizing an electronic device that enables one to determine the distance between one's position and the green with a fairly high degree of accuracy, thereby enabling one to avoid the possibility of using the wrong club.

The golf yardage finder of this invention is basically an intensity meter circuit that can be calibrated to energize a meter in conjunction with a field strength sensing circuit responsive to a signal emanating from a transmitting unit located at the pin or flag on each individual hole on a golf course. A transmitter of a specific frequency can be afixed to the uppermost portion of each individual flag stick and the actual golf yardage finder can be a rectangularly structured unit equipped with an on-off switch on an intensity meter read-out device that would be actuated by an intensity meter circuit. The components of the golf yardage finder can be produced in printed circuit form, or as an integrated circuit, or as a thin film highbred modual. The housing containing the electronic component and the meter may be produced in a molded plastic of the ABS type (acrylonitrile-butadiene-styrene).

Many other features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 2 is a meter read-out calibration of a meter which can be used in conjunction with the golf yardage finder of this invention;

FIG. 3 illustrates one form of circuit configuration of a receiver to be used in the golf yardage finder of this invention;

FIG. 4 illustrates still another circuit configuration of a golf yardage finder which can be used in conjunction with this invention, in this instance the receiver being a standard radio receiver with an automatic gain control circuit for operating a signal strength meter circuit; and FIG. 5 illustrates a circuit configuration of a signal strength meter circuit to be controlled in response to the signal strength of an automatic gain control circuit of the receiver of FIG. 4.

DETAILED DESCRIPTION OF THE ILLUSTRATED EMBODIMENTS

Figure 1:
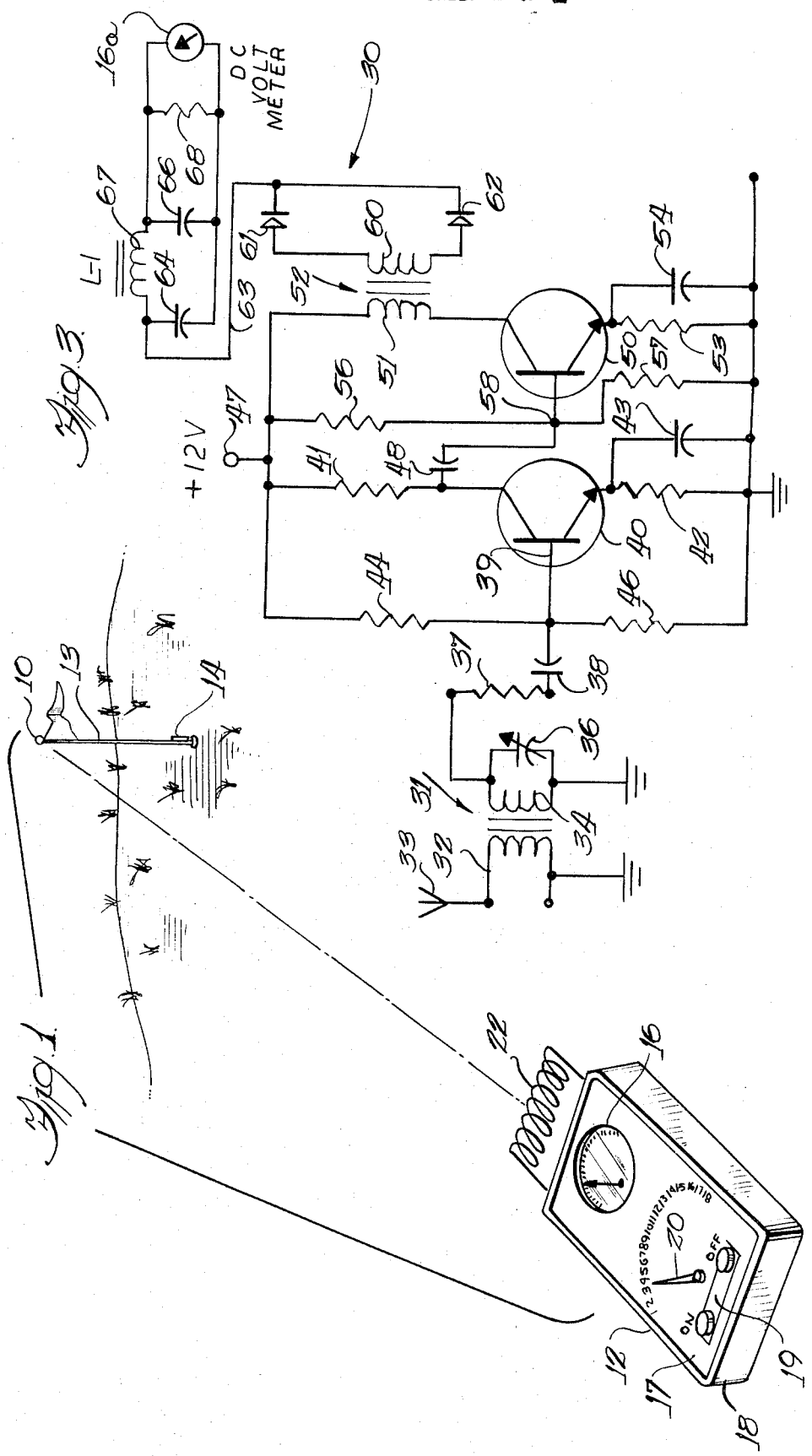
FIG. 1 is a perspective diagrammatic view illustrating a hole of a golf course and a golf yardage finder constructed in accordance with this invention for indicating the relative distance between the user of the golf yardage finder and the green of the hole then and there being played.

Referring now to FIG. 1 a golf yardage distance measuring system, to provide a visual read-out of the distance between a golfer and a green on a golf course, is illustrated in accordance with the principles of this invention and has a transmitter unit designated generally by reference numeral 10 and a receiver unit designated generally by reference numeral 12. The transmitter unit preferably is located on top of a flag pin associated with each one of the holes on a golf course while the receiver unit is adapted to fit in the pocket of the user, or it can be carried in his golf bag. Each golfer is intended to have a receiver unit 12. The frequency of the transmitter unit 10 will vary in accordance with the particular hole which is to be represented. Therefore 18 different frequency transmitters will be utilized on an 18 hole golf course. Each of the transmitter units 10 may include a depending antenna portion 13, preferably forming a part of the flagstaff, or being formed entirely of the flag stick except for an insulated bottom portion 14. The insulated bottom portin 14 prevents the RF signal from being grounded during radiation from the transmitter 10.

The receiver unit 12 includes a meter read-out device 16 preferably calibrated in yards, when the device is to be used in the United States or other countries which measure golf courses in yards. However, it will be noted that the meter read-out device 16 can be calibrated in meters when using such devices in countries which calibrate their golf courses in such distances. Located at the top front wall 17 of a housing 18 of the receiver 12 is an on-off switching device 19. The switching device 19 is to be manipulated selectively to energize and de-energize the electronic components within the receiver 12 when it is to be used or stored, respectively. Also located at the front wall 17 of the housing 18 is a selector switch 20 which is to be positioned between one of 18 different positions. It will be noted that it may also include an off position in the switching device 20 thereby eliminating the need of the on-off switching unit 19. In this instance, the 19th position switch will have an off position and one position for each of the golf holes to be played on the golf course.

In the illustrated embodiment the receiver unit 12 has a ferrite antenna structure 22, or other similar device, which is secured to the forward end portion of the housing 18. The ferrite antenna is adapted to be somewhat directional in its operation and allows the user of the receiver unit 12 to point the receiver generally toward the pin upon which the transmitter 10 is secured.

For a better understanding of the nature of calibration of the meter 16, reference is now made to FIG. 2 which illustrates the meter 16 in more detail. Preferably, the meter is calibrated from between 0 and 200, this being a measurement of yards as corresponding to a standard golf course in the United States. While the meter 16 is of the electric type well known in the art, it will be understood that the read-out can be of any other suitable device, as for example a digital read-out, or a series of lights, selected ones of which are energized corresponding to the distance being measured. Furthermore, it will be understood that the nature of the read-out being 0 to 200 from left to right can be reversed to be 200 to 0 from left to right.

To provide a frequency having a suitable wave length for an antenna to correspond to at least a quarter wave length of the frequency and be of a size sufficient to fit on the flag pin, the frequency of the transmitters preferably range from between 45 megahertz to 55 megahertz, preferably being in the order of about 50 megahertz. Furthermore it will be understood that instead of having 18 different RF frequencies to be detected for each of the 18 different holes on a golf course, a single frequency may be utilized with a code modulation therewith, and the receiver will have a selector switch to select a particular one of the codes being modulated on the carrier wave of the transmitter.

FIG. 3 illustrates one form of golf yardage distance measuring receiving unit constructed in accordance with the principles of this invention and designated generally by reference numeral 30. The receiver 30 includes an input transformer 31 having a primary winding 32 connected to an antenna circuit 33, preferably which corresponds substantially to the ferrite antenna 22 of FIG. 1. The secondary winding 34 of the transformer 31 includes a variable capacitance element 36 connected in parallel therewith. The inductance of the secondary winding 34 and the capacitor 36 form a tuned tank circuit which is adjustable to receive a selected one of a plurality of frequencies being transmitted by the various transmitter units associated with each of the holes on the golf course.

The output signal developed from the tank circuit formed by the inductance element 34 and the capacitor 36 is delivered through a resistor 37 and a capacitor 38 to the base electrode 39 of a transistor 40. The transistor 40 is an amplifier having a load resistor 41 connected to the collector electrode thereof and a current limiting resistor 42 connected to the emittor electrode thereof. Also connected in parallel to resistor 42 is a filter capacitor 43 which serves to stabilize operation of the transistor substantially that of a class A amplifier.

Operating bias is applied to the base electrode of transistor 40 through a pair of resistors 44 and 46 which form a voltage divider network between ground potential and a 12 volt supply source indicated at reference numeral 47. The amplified signal from transistor 40 is delivered through a coupling capacitor 48 to the base electrode 49 of a transistor 50. Transistor 50 has its collector electrode coupled to the primary winding 51 of a tuned output transformer 52. The emittor electrode of transistor 50 is connected to ground potential through a fixed resistor 53 which, in turn, is bypassed by a capacitor 54 which serves as a filter element, and which stabilizes operation of transistor 50 substantially that of a class A amplifier.

A voltage divider network comprising resisitors 56 and 57 are connected to provide a center tap circuit point 58 which couples to the base electrode of transistor 50 and which applies an operating bias potential thereto. The tuned transformer 52 has a center tapped secondary winding 60 which, in conjunction with a pair of diodes 61 and 62 form a full wave rectifier circuit. Therefore the frequency signal being received by the tank circuit formed of inductance element 34 and capicator 36 is then amplified, and rectified by diodes 61 and 62 to provide an output signal over a line 63. This output signal is filtered by a pair of filter capacitors 64 and 66 and an inductance element 67. A load resistor 68 is connected in parallel with capacitor 66 and serves as a resistance bleeder network for the filter circuit. The meter read-out device associated with the circuit is here indicated by reference numeral 16a, and corresponds substantially to that of the meter read-out device 16 of FIGS. 1 and 2.

Referring now to FIG. 4 there is seen an alternate embodiment of the present invention and is designated generally by reference numeral 70. Here the plurality of different frequency transmitters is indicated generally by reference numeral 71 and corresponds to each of the transmitter units associated with each hole of the golf course. The transmitter units are operated continuously during the normal playing period of the golf course and reception of the transmitted signals is achieved by the antenna 72 associated with the receiver circuit 70. Here again the antenna circuit 72 corresponds substantially to that of the ferrite antenna 22 of FIG. 1. The antenna 72 delivers the received signal to an inductance element 73 and to a plurality of capacitors designated generally by reference numeral 75. The capacitors 75 preferably are of different capacitance value, and only one of which is connected in parallel with inductance element 73 at any given instant.

A manually operated selector switch 76 has the center portion 77 thereof connected to ground potential thereby paralleling the selected capacitor with that of the inductance element 73. In this instance the number of taps on the switching device is one more than that of the number of holes on a golf course thereby providing an off position as indicated by reference numeral 78. When it is desired to determine the distance where the golfer stands to that of the green at hole 1 selector switch 76 is positioned to number 1 on the indicator dial. This will place the first capacitor to the left of the plurality of capacitors 75 in circuit with inductance element 73 to provides a tuned circuit. The output of the tuned circuit is delivered to an RF amplifier stage 79, which may be a standard radio receiver RF amplifier.

In this instance the local oscillator circuit 80 has the output thereof delivered to a mixer circuit 81 simultaneously with that of the output of the RF amplifier 79.

The mixer circuit 81 produces an intermediate frequency and delivers it to an IF amplifier stage 82. The IF amplifier stage 83 includes an automatic gain control (AGC) which is a standard automatic gain control circuit found in any radio receiver. The amplitude output of the gain control circuit varies inversely with the intensity of the signal being received. Therefore the closer the receiver is to the transmitter at the flag pin the more voltage will be generated at the automatic gain control circuit. The more voltage generated will produce a lower reading on the scale of the meter of FIG. 2. The automatic gain control line 83 is connected to a meter read-out circuit 84 to produce the desired meter reading.

FIG. 5 illustrates the details of circuitry of the meter read-out circuit 84 of FIG. 4. Here the AGC line 83 is connected to a variable resistance element 90 which, in turn, has a movable contact thereof connected to the center tap 91 of parallel resistors 92 and 93. Resistors 92 and 93 form one leg of a bridge circuit in conjunction with a second pair of resistors 94 and 95. Connected across the legs of the bridge circuit is a transistorized meter circuit comprising a pair of transistors 96 and 97 which have their collector electrodes tied together and to a common circuit point between the legs of the bridge. The emittor electrodes of transistors 96 and 97 are connected to a potentiometer 100, which, in turn, has the movable contact thereof connected to ground potential through a line 101. The meter 16b is connected between the emitter electrodes of transistors 96 and 97 and is calibrated by the adjustment of the various potentiometers within the circuit.

To calibrate the circuit of FIG. 5 the antenna circuit 72 of the receiver 70 is temporarily short circuited to ground potential thereby eliminating all reception of RF signals. The RF gain control circuit of the receiver is turned up and potentiometer 100 is adjusted for a reading 200 yards or more. This will be the maximum effective range of the golf yardage distance receiver of this invention when calibrated in this manner. However it can have other ranges by calibrating it differently. When the antenna is no longer grounded any deflection of the meter will be caused by an incoming signal. When the signal intensity varies with the distance to which the receiver is placed from the transmitter it will indicate the relative signal strength, thereby indicating the distance between transmitter and receiver.

While several specific embodiments of the present invention have been illustrated herein, it will be understood that variations and modifications may be effected without departing from the spirit and scope of the novel concepts of this invention. For example, variations as to component values and circuit configurations may be made without departing from the novel aspects of this invention.

Having thus described the invention, what is claimed is:

1. A golf yardage distance measuring system to provide a visual read-out of the distance between a golfer and a green on a golf course, comprising in combination:

a plurality of transmitter units to be located at the green of each hole of a particular golf course, each transmitter adapted to radiate an RF signal outwardly from the green and over the approach fairway leading up to said green, a receiver unit to be carried by a golfer who is playing on said particular golf course, said receiver unit includes a meter read-out device and an RF signal strength detecting circuit coupled thereto to be responsive to one of said plurality of transmitter units, said read-out device being calibrated in a distance measurement corresponding to the distance measurement common to said particular golf course, said receiver unit includes an automatic gain control circuit responsive to the reception of RF signal energy transmitted from a selected one of said plurality of transmitter units, said automatic gain control circuit producing an output voltage having a value indicative of the distance between said transmitter unit and said receiver unit, said automatic gain control circuit including a calibrated meter for indicating the relative range of distances to be measured in the order of about between 0 and 200 yards; whereby said receiver unit is activated by a selected one of said plurality of transmitter units to provide direct indication of said read-out device of the distance of said golfer and said selected one of said plurality of transmitter units thereby allowing the golfer to know exactly which golf club to use for the approach shot to the green.

2. The golf yardage distance measuring system to provide a visual read-out of the distance between a golfer and a green on a golf course, as set forth in claim 1 wherein, said read-out device is a meter forming a center leg of a balanced bridge circuit, said read-out device being responsive to the value of said automatic gain control circuit to produce an output reading responsive to the voltage value of said automatic gain control circuit.

3. The golf yardage distance measuring system to provide a visual read-out of the distance between a golfer and a green on a golf course, as set forth in claim 2 wherein, said balanced bridge circuit includes a pair of transister elements having the base electrodes thereof forming a connection across a common resistance bridge, said transisters having the emitter electrodes thereof connected together and to one leg of the bridge and the collector electrodes connected together and to the other leg of said bridge, said emitter electrodes being connected to said meter read-out device, and further including a resistance balancing device to calibrate said meter read-out device in response to the absence of a signal received from any one of said plurality of transmitter units.

* * * * *